United States Patent
Konnai

(10) Patent No.: US 6,579,619 B1
(45) Date of Patent: Jun. 17, 2003

(54) POTASSIUM TITANATE POWDER

(75) Inventor: Hidefumi Konnai, Tokyo (JP)

(73) Assignee: Kawatetsu Mining Co., Ltd., Tokyo (JP)

(*) Notice: Subject to any disclaimer, the term of this patent is extended or adjusted under 35 U.S.C. 154(b) by 0 days.

(21) Appl. No.: 09/610,219

(22) Filed: Jul. 3, 2000

(30) Foreign Application Priority Data

Jul. 6, 1999 (JP) ............................................. 11-225610

(51) Int. Cl.$^7$ ................................................. B32B 5/16
(52) U.S. Cl. ........................ 428/402; 428/403; 428/404; 428/406; 423/598; 423/608; 423/641
(58) Field of Search ................................. 428/402, 403, 428/404, 406; 423/598, 608, 641

(56) References Cited

U.S. PATENT DOCUMENTS 6,036,938 A * 3/2000 Konnai et al. .............. 423/592
6,335,096 B1 * 1/2002 Konnai ...................... 428/402

FOREIGN PATENT DOCUMENTS

| JP | 56 014535 | 4/1981 |
| JP | 04 091179 | 3/1992 |
| JP | 04 321517 | 11/1992 |
| JP | XP002151184 | * 9/1998 |
| JP | 10 236823 | 9/1998 |

OTHER PUBLICATIONS

Stanton, Mearl F. et al., Relation of Particle Dimension to Carcinogenicity in Amphibole Abestoses and Other Fibrous Minerals, JNCI, J. Natl. Cancer Inst. 1981 67(5), 965–75.
U.S. patent application No. 09/519,461 filed Mar. 6, 2000—corresponds to U.S.P. 6,335,096.

* cited by examiner

Primary Examiner—Leszek Kiliman
(74) Attorney, Agent, or Firm—Oliff & Berridge, PLC

(57) ABSTRACT

Potassium titanate powder with no risk of carcinogenic property, comprising particles with a length of less than 2 μm, a length/breadth ratio of less than 5 and, further, comprising 90% or more of particles with the ratio less than 2 and 97% or more of particles with the ratio of less than 3, based on the ratio of the number of particles.

10 Claims, 3 Drawing Sheets

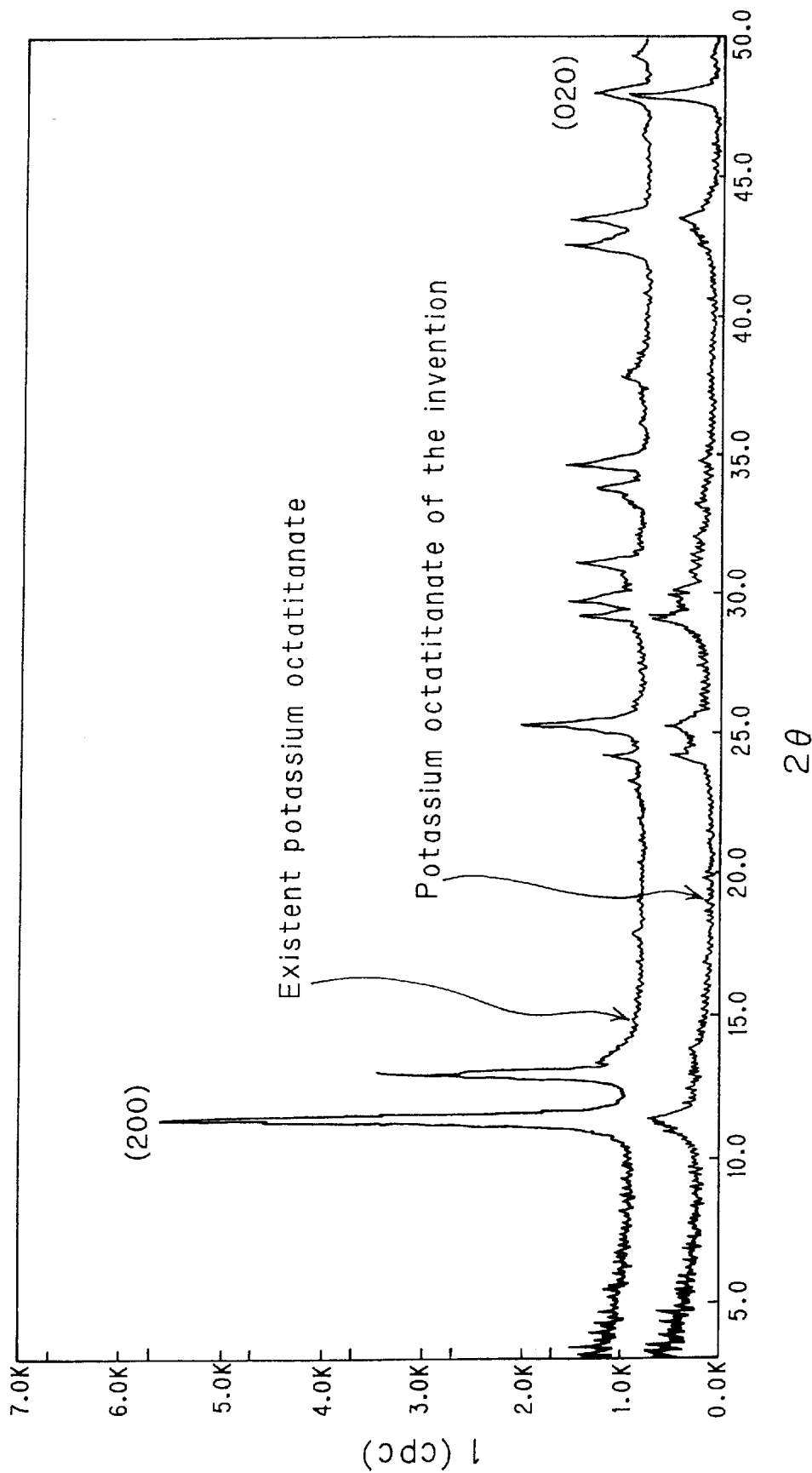

POTASSIUM TITANATE POWDER

BACKGROUND OF THE INVENTION

1. Field of the Invention

This invention concerns a potassium titanate powder used as additives to plastics, friction material, paints, lubricants, heat resistant materials, heat insulative materials and paper products and, more in particular, it relates to a potassium titanate powder with an importance being attached to configurational characteristics in view of sanitation.

2. Statement Related Art

Potassium titanate inherently has a shape of several $\mu$m to several tens $\mu$m length and 1 $\mu$m or less diameter and generally referred to, for example, fibers, needles or whiskers in view of the shape. Potassium titanate is put to practical use and popularized mainly as reinforcing materials in the field of plastics, paints and frictional materials taking advantage of the fibrous shape thereof. However, the fibrous powder has a nature of bulkiness, poor fluidity and inconvenience in handling. In addition, the fibrous powder tends to cause dusting to result in a problem in view of working environment.

There has been a problem of carcinogenicity for asbestos and this is sometimes considered to be attributable to the fibrous shape thereof. According to the Stanton's assumption for the fibrous material, fibers with a diameter of 0.25 $\mu$m or less and a length of 8 $\mu$m or more are highly tumorigenic. Industrially useful fiber materials are utilized under the regulation in view of the working environment. Those fibers having a diameter of 3 $\mu$m or less, a length of 5 $\mu$m or more and the length to diameter ratio of 3 or more are specified as respirable fibers by ILO (International Labor Organization). Such fibers are specified to be managed as fibrous dusts also by AIA (Asbestos International Association), DFG (Deutsche Forschungs Gemeinschaft).

OBJECT OF THE INVENTION

It is an object of this invention to provide a potassium titanate powder of excellent configurational characteristic not having the shape and the dimension of the respirable fibers with a view point of safety.

In view of the above, the present inventor has already filed Japanese Patent Application Hei 11(1999)-103033, and the present invention concerns potassium titanate of higher safety.

SUMMARY OF THE INVENTION

This invention has been developed for attaining the foregoing object and provides a potassium titanate powder having a length of particles of less than 2 $\mu$m. More preferably, the powder having a length of particles of less than 1 $\mu$m. Further, potassium titanate particles of this invention has a length/breadth ratio (aspect ratio) of less than 5.

Further, the potassium titanate powder of this invention comprises 90% or more of particles with the length/breadth ratio of less than 2 and 97% or more of particles with the length/breadth ratio of less than 3 on the basis of the number of particles.

Potassium titanate of this invention is represented by the formula; $K_2O \cdot nTiO_2$ (n=1–12).

The potassium titanate particles of this invention having the characteristic that the length is less than 2 $\mu$m can be produced by firing a mixture of one or more of carbonate, hydroxide, nitrate and sulfate as a K source that forms $K_2O$ by firing and one or more of Ti sources such as $TiO_2$ and titanium hydroxide, thereby forming particles with the length of less than 2 $\mu$m, slurrying them with addition of water, adding an acid to leach out excess $K^+$ ions to condition an aimed composition, dehydrating and then applying heat treatment.

The shape of the particles is determined by the first firing and does not change substantially in the succeeding steps, that is, slurrying, conditioning for composition and heat treatment.

When a mixture of K source and Ti source is fired particles of potassium titanate with the length of 2 $\mu$m or more are usually formed by crystal growth, in which most of particles have a length/breadth ratio of 2 or more Potassium titanate of this invention can be obtained by firing with the temperature for the first firing being at a low temperature near the lowest temperature at which reaction can proceed and for a firing time being restricted to such a short period that crystal growth does not proceed.

The blending ratio for the K source and the Ti source is within a molar ratio of 1 to 6 as $TiO_2/K_2O$. Particles with the length of 2 $\mu$m or more and the length/breadth ratio of 2 or more increase if the molar ratio is less than 1 and the reaction less proceeds if the molar ratio is more than 6.

The firing temperature is within a range from 750 to 850° C. The reaction less proceeds at a temperature lower than 750° C., while the ratio of particles with the length of 2 $\mu$m or more and the length/breadth ratio of 2 or more increases at a temperature higher than 850° C.

For the firing method, a rotary kiln system is suitable. Firing method in a stationary state causes uneven temperature distribution tending to form particles with the length of 2 $\mu$m or more and the length/breadth ratio of 2 or more. And a rotaly kiln system is preferable to complete the synthesis reaction at a short firing time.

Particles with the length of less than 2 $\mu$m can also be formed by firing a mixture in which a small amount of one or more of carbonate, hydroxide, nitrate, sulfate and alkali halide of alkali metals such as Li, Na, Rb and Cs other than K is added to the K source and the Ti source. It is supposed that addition of the alkali metal other than K functions to lower the melting point of the mixture during firing tending to complete the synthesis reaction at a lower temperature thereby suppressing crystal growth to the fibrous shape.

The alkali metal slightly solid solubilizes into crystals of potassium titanate of this invention to form solid solution and can be used within a range satisfying an aimed X-ray diffraction pattern.

The thus obtained potassium titanate particles with the short length and low length/breadth ratio exhibit weak diffraction intensity and shows a diffraction line of wide full width at half maximum (FWHM) in the X-ray diffractiometry. This shows that the material is the low crystallinity and not in the fibrous shape.

Further, particles of flat and thin shape can be obtained by controlling the blending of the starting materials and the firing condition, when the flat particles are put to X-ray diffractiometry, it is observed that the diffraction intensity ratio for (h00)/(0k0) of the miller index shown by (hk1) is 3 or less as one of the features of the diffraction pattern. It is considered that this is attributable to the orientation of (0k0) crystal face. While existent fibrous potassium titanate extends in the direction of b-axis, potassium titanate of this invention is observed as thin and flat particles, and it is considered that it grows greatly in the two directions of a-axis and c-axis. Such potassium titanate particles are also free from fibrous property and suitable in view of safety.

In the potassium titanate particles of this invention, such a small amount of $TiO_2$ unreacted with the K source and $TiO_2$ formed by thermal decomposition of potassium titanate as detected qualitatively by X-ray diffractiometry may be present together unless they give problems in view of the application use. Further, they may contain secondary particles formed from cohesion of primary particles to some extent as ordinarily found in the powdery particles of industrial products.

Potassium titanate of this invention is a powder comprising particles. Alternatively, it is flat and has a property tending to orient. Accordingly, it forms a uniform sliding surface to provide excellent sliding characteristic as a brake material or the like. Further, it gives a high dimensional accuracy when blended with plastic materials and is suitable to precision molding products in view of improvement of the rigidity and provision of the surface smoothness.

Further, it is expected for the application uses in the fields by taking the advantage thereof for blending at higher ratio compared with fibrous potassium titanate.

BRIEF DESCRIPTION OF THE DRAWINGS

FIG. 4 is an X-ray diffraction chart for examples and existent example.

PREFERRED EMBODIMENT OF THE INVENTION

Figure 1:
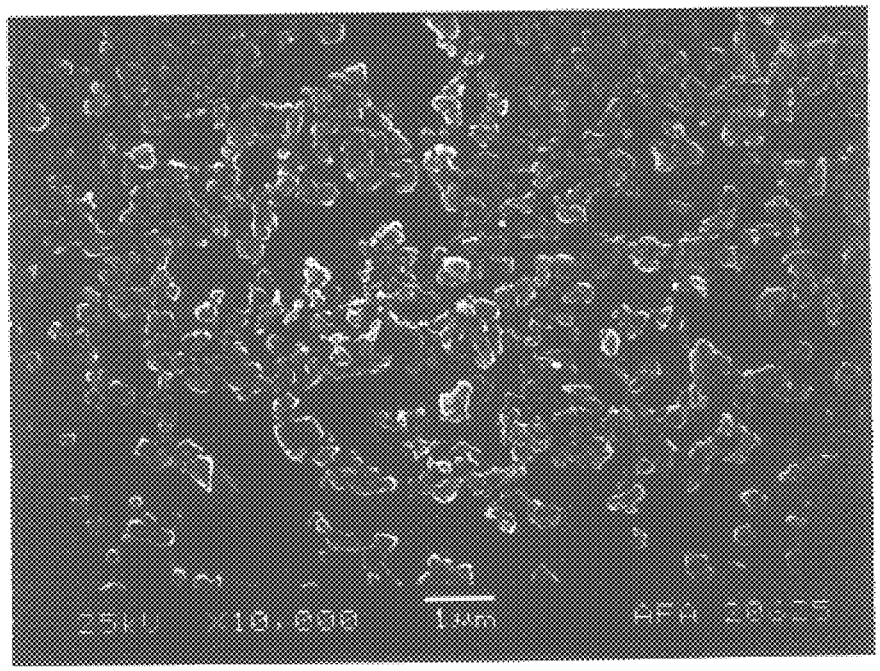
FIG. 1 is a microscopic photograph by 10000X for powdery potassium titanate particles of examples.

Particles with a high length/breadth ratio are generally referred to as fibers, needles and whiskers but they were not defined by concrete numeral values for the length/breadth ratio. Then, the length/breadth ratio is defined as less than 5 in this invention in view of the balance between the safety and the productivity. Further, the length/breadth ratio is defined. as less than 3 and less than 2. as an index for the distribution of the particle shape in this invention.

The length of less than 2 $\mu$m is defined in order to avoid a risk of undesired effects on human bodies by the fibers in a macro point of view. For example, SEM (Scanning Electron Microscope) observation for fine asbestos pieces present in lungs of patients suffering from mesothelioma has been reported. While relation between malignant tumor such as mesothelioma and lung cancer and asbestos or carcinogenic mechanism have not yet been apparent at present it may be considered generally as below.

When asbestos reach pulmonary cells, cells for killing obstacles, namely, macrophages are activated and they act to ingest the asbestos and make them non-toxious by secreting protease. However, macrophages of about 3 to 5 $\mu$m can not ingest asbestos having larger fiber length but, on the contrary, membranes of macrophages are broken. It is said that the protease leaks to the surrounding to destroy the pulmonary cells comprising proteins to cause inflammation. On the other hand, particles having less fiber property, even if they reach the pulmonary cells, are discharged to the outside of the body upon inhalation if discharged to the outside of the body upon inhalation if the length is 1 $\mu$m or less.

Accordingly, this invention provides potassium titanate with the length of less than 2 $\mu$m, preferably, less than 1 $\mu$m and with a low length/breadth ratio.

For the application use not requiring the fibrous property, it is desired to be free from respirable fibers.

Further, since potassium titanate comprising thin and flat particles is not respirable fibers, it is suitable. More specifically, it is suitable that the thickness is one-half or less of the breadth.

Potassium titanate has such physical properties as high whiteness, low Mohs hardness, low heat conductivity and high refractive index, and has characteristics excellent in heat resistance, chemical resistance and sliding property. Accordingly, in addition to the application uses as the reinforcing materials, potassium titanate can be utilized also as additives to plastics, friction materials, paints and paper products, as well as lubricants, heat resistant materials, heat insulative materials, electric insulative materials, ion exchangers and catalysts. Further, while the fibrous powder is bulky, poor in the fluidity and difficult to be handled with, potassium titanate of this invention has a wide application range being improved with such defects. Upon application, surface treatments such as coupling agents may be applied so as to conform the purpose and, in addition, it may be granulated optionally.

Since potassium titanate particles provide anti-frictional property by blending with plastics, they are suitable to the application use such as sliding parts.

In a case of use for the friction materials such as brakes, they exhibit excellent frictional performance such as stabilization of the friction coefficient compared with the case of using existent potassium titanate fibers.

EXAMPLE

Firing products of different particle shape and distribution were obtained by changing the blending ratio of mixtures with addition of a small amount of alkali metal other than K in addition to $K_2CO_3$ and $TiO_2$, and the firing conditions. Then, water was added to each of the firing products to form slurry and HCl was further added to leach out $K^+$ ions to condition the $TiO_2/K_2O$ molar ratio. Then, heat treatment was applied to obtain $K_2O.8TiO_2$ particles.

When the fine particles of $K_2O.8TiO_2$ were chemically analyzed respectively, the amount of the alkali metal other than K was 3 wt % or less as $R_2O$ ( R: alkali metal).

Further, the electron microscopic image for $K_2O.8TiO_2$ fine particles were analyzed to determine the size for the length and the breadth and the length/breadth ratio for individual particles and examine the ratio for the number of particles with the length/breadth ratio of less than 3 and less than 2, as well as minimum value, maximum value and mean value for each of them.

Further, they were subjected to supersonic dispersion in water and the particle size distribution was measured by a laser type particle measuring equipment based on the measuring principle of Fraunhofer diffraction and Mie scattering, to determine cumulative under size 100% diameter (wt %) and 50% diameter (wt %).

The X-ray diffraction was measured by CuKa ray using a slit of DS=1°, SS=1°, RS=0.3 mm. The diffraction intensity ratio for (200)/(020) of $K_2O.8TiO_2$ was determined. Firing conditions of samples are shown in Table 1. and results are shown in Table 2

TABLE 1

| | Starting material | | Firing condition | |
| --- | --- | --- | --- | --- |
| Example | TiO$_2$/K$_x$O molar ratio | Alkali metal (Mass %) | Kiln | Maximum Temperature C.° |
| 1 | 5.2 | Na$_2$CO$_3$(5) | Rotaly kiln | 750 |
| 2 | 3.1 | NaNO$_3$(4) | Rotaly kiln | 800 |
| 3 | 1.8 | NaCL(3) | Rotaly kiln | 850 |

The particles of potassium titanate obtained in Examples 1 to 3 had such a shape that the length was 0.74 to 1.73 μm at the maximum, the length/breadth ratio was 2.95 to 4.56 at the maximum as shown in Table 1. Further, the ratio based on the number of the particles with the length/breadth ratio of less than 5 was 100%, the ratio based on the number of particles with the ratio of less than 3 was 98.7 to 100% and the ratio based on the number of particles with the ratio of less than 2 was 93.8 to 98.0%. (200)/(020) X-ray diffraction intensity ratio was 0.65 to 2.54.

Figure 2:
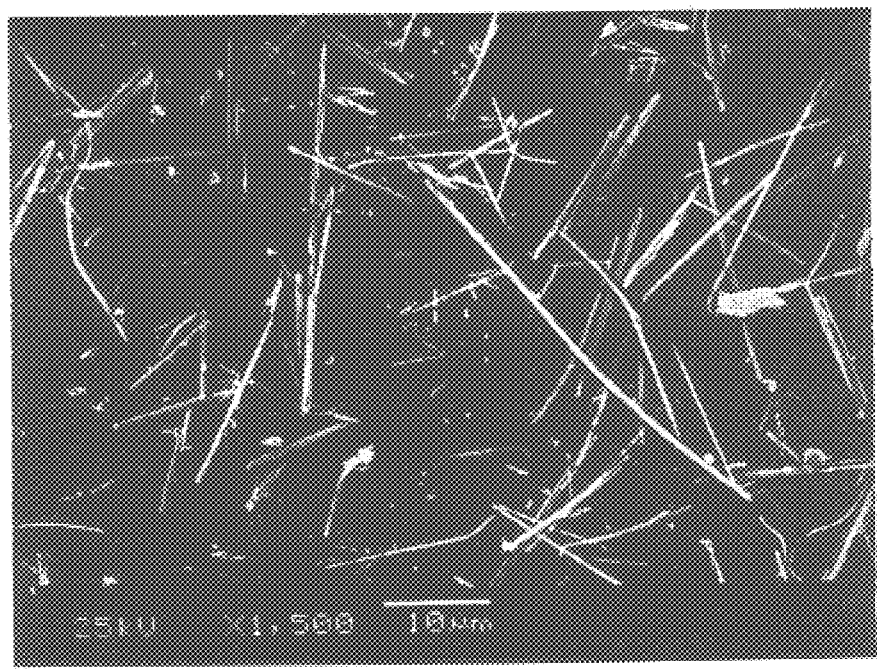
FIG. 2 is a microscopic photograph by 1500X for powdery existent potassium titanate particles.

FIG. 1 is a typical microscopic photograph by 10000 X for potassium titanate particles of this invention obtained in Example 1, and FIG. 2 shown for comparison is a microscopic photograph of 1500X for existent potassium titanate. While the existent potassium titanate shown in FIG. 2 exhibits the fibrous shape, particles of the example shown in FIG. 1 have a length of 1 μm or less and most of them have a length/breadth ratio of 2 or less. Further, thin and flat particle shape was observed.

Figure 3:
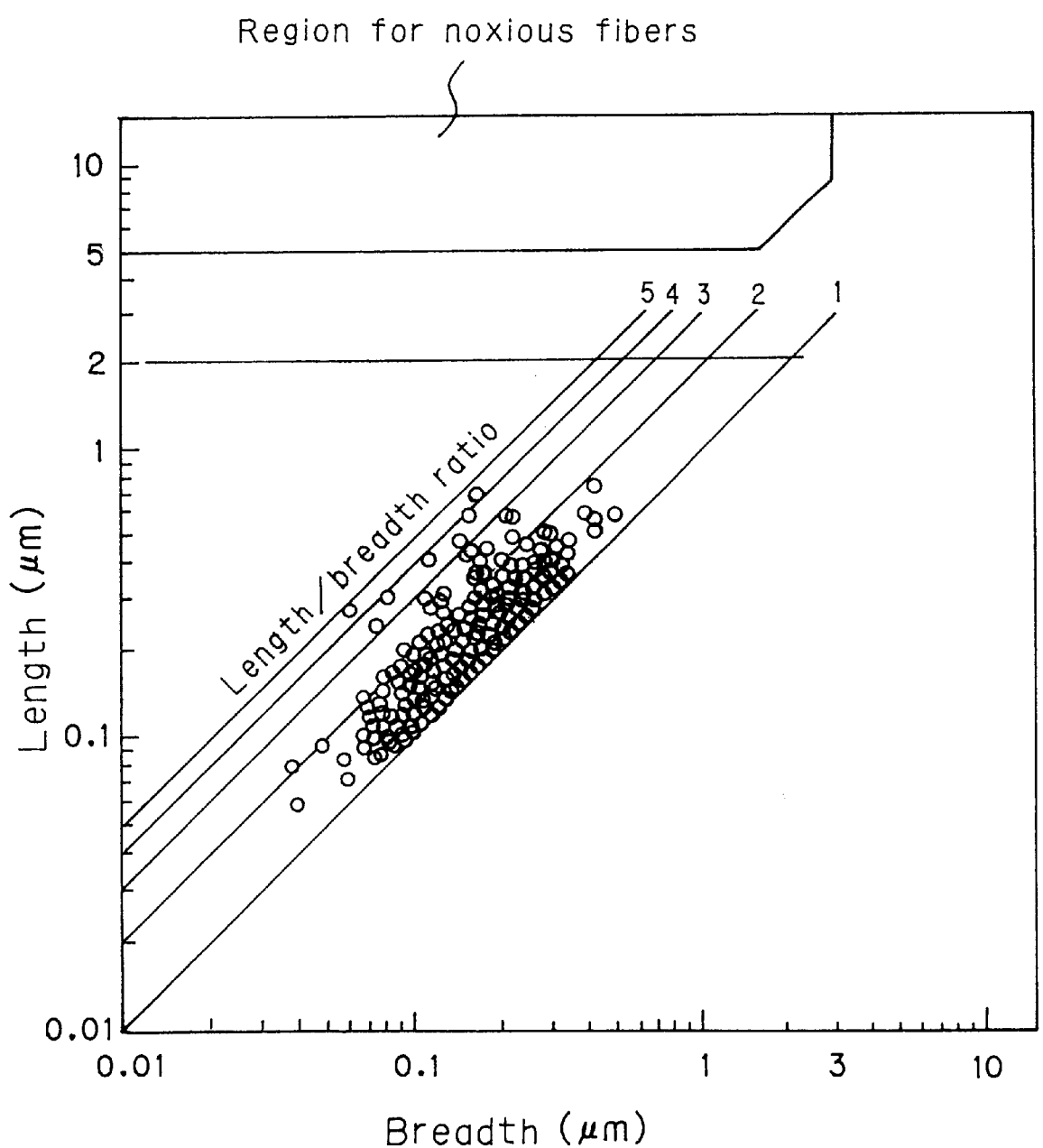
FIG. 3 is a graph showing the size distribution of a relationship between length and breadth of the powdery particles of the examples.

In FIG. 3, relation between the breadth and the length is plotted for the particles of Example 1 of this invention. In the figure, lines for the length/breadth ratio=1, 2, 3, 4 and 5 are described. There are no particles at all exceeding the length/breadth ratio of 5. The figure also shows a region for noxious fibers with the length of 5 μm or more, the breadth of 3 μm or less and the length/breadth ratio of 3 or more..

FIG. 4 shows an X-ray powder diffraction pattern for the shown in FIG. 1 and FIG. 2. While existent potassium octatitanate shows a sharp diffraction peak, potassium octatitanate of this invention shows low crystallinity. The (200)/(020) diffraction intensity ratio is 6.3 in the existent product but it was 0.65 in Example 1. The (200)/(020) diffraction intensity ratio is 3 or less also in Examples 2 and 3.

This invention provides potassium titanate particles with the length of less than 2 μm. The particles also have a low length/breadth ratio and gives no undesired effect on human bodies and since they do not contain respirable fibers, they can be used safely in various kinds of application uses.

What is claimed is:

1. A potassium titanate powder consisting essentially of particles with the length of less than 2 μm.

2. A potassium titanate powder as defined in claim 1, comprising particles with a length/breadth ratio of the particles of less than 5.

3. A potassium titanate powder as defined in claim 1, comprises 90% or more of particles with the length/breadth ratio of less than 2 and 97% or more of particles with said ratio of less than 3 on the basis of the ratio of the number.

TABLE 2

| Example | Length (μm) | | | Breadth (μm) | | | Length/breadth ratio | | | Ratio for N: length/breadth <5 (%) | Ratio for N: length/breadth <3 (%) | Ratio for N: length/breadth <2 (%) | Particle size distribution (μm) | | X-ray diffraction (200)/(020) |
| --- | --- | --- | --- | --- | --- | --- | --- | --- | --- | --- | --- | --- | --- | --- | --- |
| | Min | Max | Mean | Min | Max | Mean | Min | Max | Mean | | | | D100 | D50 | intensity ratio |
| 1 | 0.06 | 0.74 | 0.23 | 0.04 | 0.50 | 0.16 | 1.00 | 4.56 | 1.45 | 100 | 98.7 | 93.8 | 1.00 | 0.53 | 0.65 |
| 2 | 0.11 | 0.92 | 0.31 | 0.07 | 0.62 | 0.21 | 1.00 | 3.13 | 1.27 | 100 | 99.1 | 97.5 | 1.25 | 0.61 | 1.24 |
| 3 | 0.21 | 1.73 | 0.75 | 0.11 | 1.59 | 0.59 | 1.00 | 2.95 | 1.12 | 100 | 100 | 98.0 | 1.84 | 1.42 | 2.54 |

4. A potassium titanate powder as defined in claim 1, wherein the particles comprise a thin and flat shape.

5. A potassium titanate powder as defined in claim 1, wherein the diffraction intensity ratio for (h00) /(0k0) in the X-ray diffractiometry is 3 or less.

6. A potassium titanate powder as defined in claim 1 comprising particles containing an alkali metal other than K.

7. A potassium titanate powder as defined in claim 2 comprising particles containing an alkali metal other than K.

8. A potassium titanate powder as defined in claim 3 comprising particles containing an alkali metal other than K.

9. A potassium titanate powder as defined in claim 4 comprising particles containing an alkali metal other than K.

10. A potassium titanate powder as defined in claim 5 comprising particles containing an alkali metal other than K.

* * * * *